(No Model.)
J. P. ORR.
SPECTACLES.
No. 586,074.  Patented July 6, 1897.
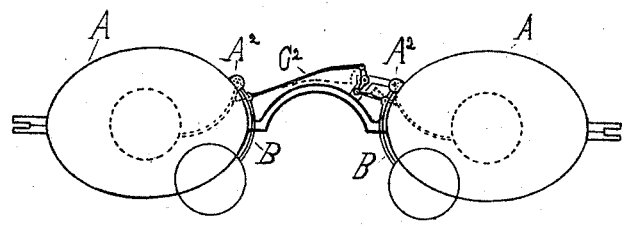
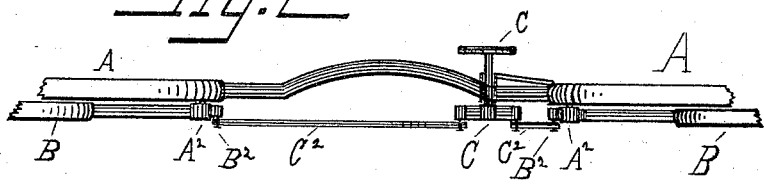
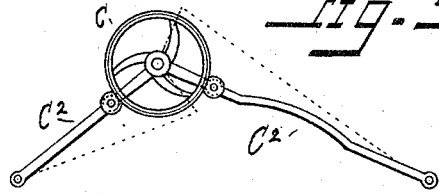
Witnesses
Geo H Pugh
H W Keey
Inventor
James P. Orr

UNITED STATES PATENT OFFICE.

JAMES P. ORR, OF PITTSBURG, PENNSYLVANIA.

SPECTACLES.

SPECIFICATION forming part of Letters Patent No. 586,074, dated July 6, 1897.

Application filed July 11, 1896. Serial No. 598,894. (No model.)

*To all whom it may concern:*

Be it known that I, JAMES P. ORR, a citizen of the United States, residing at Pittsburg, in the county of Allegheny and State of Pennsylvania, have invented a new and useful Improvement in Spectacles, of which the following is a specification.

My invention relates to improvements in spectacles in which the magnifying power of the lens is increased by swinging another lens between stationary lens and pupil of eye; and the objects of my invention are, first, to provide in one pair of spectacles the advantages of two; secondly, by suitable mechanism to afford facilities for the adjustment of swinging lenses in or out of the field of vision. I attain these objects by the mechanism illustrated in the accompanying drawings, in which—

Figure 1 is a side elevation of entire mechanism except thumb-wheel. Fig. 2 is a plane view of all the parts, and Fig. 3 is a side elevation of thumb-wheel with links $C^2$ in position of "dead-center" with crank-arms of wheel C.

Similar letters refer to similar parts in all the views.

The frame A A is of the usual pattern, to which are attached pivotally on pin at $A^2$ frames B B, having pins $B^2 B^2$, by which they are connected to thumb-wheel C by links $C^2 C^2$ in such a manner that when wheel C is made to turn links $C^2 C^2$ will be extended, causing frames B to swing upward, taking position shown by dotted lines and maintained in that position by links $C^2$, being in the position of dead-center.

As shown in Fig. 3, when wheel C is turned in the opposite direction links $C^2$ are thrown off dead-center and arms B are made to swing downward and inward and maintained in that position by gravitation.

Wheel C is mounted on a journal having a bent lever or double crank at the other end of journal and adapted to turn in a sleeve which is rigidly mounted on frame A, as shown in the drawings.

I am aware that prior to my invention double-lens spectacles have been made. I therefore do not claim such a combination broadly; but What I do claim as my invention, and desire to secure by Letters Patent, is—

1. The combination of pins $A^2$, $A^2$, and a sleeve rigidly mounted on a spectacle-frame, with a journal to turn in said sleeve having mounted thereon a wheel C at one end and on the other end a double crank having a link connection with swinging arms B, pivotally mounted on pins $A^2$ all substantially as specified.

2. The combination in a spectacle-frame of a double crank mounted on a journal, with arms B having link connections with said cranks and adapted to sustain arms B, in a horizontal position when said cranks and links are in position known as "dead-center," all substantially as described.

JAMES P. ORR.

Witnesses:
H. W. WEEKS,
T. C. MORGAN.